United States Patent [19]

Tanaka et al.

[11] Patent Number: 6,126,077
[45] Date of Patent: Oct. 3, 2000

[54] DATA PROCESSING APPARATUS AND METHOD AND DATA TRANSMITTING/ RECEIVING APPARATUS AND METHOD

[75] Inventors: Katsuyuki Tanaka, Kanagawa; Shigeru Arisawa, Tokyo; Susumu Kusakabe; Akira Iga, both of Kanagawa, all of Japan

[73] Assignee: Sony Corporation, Tokyo, Japan

[21] Appl. No.: 08/872,619

[22] Filed: Jun. 10, 1997

[30] Foreign Application Priority Data

Jun. 20, 1996 [JP] Japan ............................. P08-159465

[51] Int. Cl.[7] .................................................. G06K 5/00
[52] U.S. Cl. ........................................ 235/492; 235/380
[58] Field of Search ................................. 235/449, 492, 235/439, 375, 380

[56] References Cited

U.S. PATENT DOCUMENTS

5,175,418  12/1992  Tanaka .................................... 235/439
5,362,954  11/1994  Komatsu et al. ....................... 235/492
5,418,353   5/1995  Katayama et al. ..................... 235/380
5,469,512  11/1995  Fujita et al. ........................... 382/118

*Primary Examiner*—Donald Hajec
*Assistant Examiner*—Mark Tremblay
*Attorney, Agent, or Firm*—Limbach & Limbach L.L.P.; Seong-Kun Oh

[57] ABSTRACT

Method and apparatus for providing communication with a higher communication rate while maintaining the occupied frequency band narrow, a signal processing unit of a reader/writer unit Biphase Shift Keying (BPSK)-modulates data to be transmitted, and thereafter outputs the modulated signal to a modem. The modem Amplitude Shift Keying (ASK)-modulates the modulated signal and outputs the ASK-modulated signal to a first loop coil. The first loop coil generates a magnetic field corresponding to the modulated wave. An IC card converts a part of the magnetic field radiated from the reader/writer unit with another loop coil to generate a power source from the electrical signal, and also extracts the data transmitted. In the case of transmitting the data to the reader/writer unit, a load of another loop coil is changed in accordance with the data. The reader/writer unit detects, with the first loop coil, any change in load of another loop coil of the IC card magnetically coupled with the first loop coil.

81 Claims, 9 Drawing Sheets

FIG. 5A BPSK CARRIER

FIG. 5B EXAMPLE OF DATA

FIG. 5C MODULATED WAVE (DIFFERENTIAL CONVERSION)

FIG. 5D MODULATED WAVE

DATA PROCESSING APPARATUS AND METHOD AND DATA TRANSMITTING/RECEIVING APPARATUS AND METHOD

BACKGROUND OF THE INVENTION

1. Field of the Invention

The present invention relates to a data processing apparatus and method, and a data transmitting/receiving apparatus. More specifically, the present invention relates to a data processing apparatus and method for receiving an electromagnetic wave which is Amplitude Shift Keying (ASK)-modulated corresponding to a predetermined data, rectifying such electromagnetic wave as a power source, and transmitting such data by controlling a load condition to the power source, and a data transmitting/receiving apparatus and method for transmitting the ASK-modulated electromagnetic wave corresponding to the predetermined data with the predetermined transmitting means and receiving the data by detecting any change of the load condition of the transmitting means.

2. Related Background Art

Introduction of a reader/writer (R/W) and an IC card for data exchange on non-contact basis is now under discussion for a ticket inspecting machine, security system and electronic money system.

In the reader/writer (R/W), the carrier is modulated with the data to be transmitted by the predetermined system and the modulated electromagnetic wave (for example, magnetic field) is radiated to an IC card.

The IC card receives such electromagnetic wave and demodulates the received electromagnetic wave to the original data by the corresponding demodulating system and processes such data within the predetermined electronic circuits. Upon completion of processing of such data, the IC card transmits a response to such data to the R/W, causing to receive such data.

A certain kind of IC card explained above is a so-called batteryless type IC card which is not provided with batteries and utilizes the power of the electromagnetic wave obtained by rectifying the wave received as a DC power source.

In the case of transmitting the data to the batteryless type IC card, R/W utilizes the Phase Shift Keying (PSK) and Frequency Shift Keying (FSK) modulation method in which the modulated wave can easily be converted to the stable DC signal or amplitude of the modulated wave is constant. As explained above, by keeping the amplitude of the modulated wave constant, voltage fluctuation of the power source obtained by rectifying the electromagnetic wave received by the IC card can be reduced and thereby the stable power can be supplied to the electronic circuits.

However, the use of the PSK or FSK modulation system will result in the possibility that the frequency spectrum of the electromagnetic wave are transmitted or received spread over a wide frequency band to potentially give adverse effects on the existing communication system and the other electronic devices.

Moreover, it is also possible to restrict the frequency band occupied by the electromagnetic wave to a predetermined range, but such restriction will result in difficulty considered as a problem in transmission and reception in the higher communication rate. For instance, if the non-contact card system explained above is introduced into the ticket inspecting apparatus, too much time is required to process the data.

Alternatively, it has also been proposed for the R/W to radiate two electromagnetic waves in different frequencies, one electromagnetic wave for supplying power and the other wave for data communication. However, this approach requires that the occupied frequency band become wide due to the use of two different frequency bands. Moreover, the electronic circuits will likely become large because the two kinds of electromagnetic waves in different frequencies are transmitted or received.

The present invention has been proposed in view of the background discussed above to realize information communication with a higher communication rate and supplying satisfactory power source to an IC card while keeping the narrow occupied frequency bandwidth by utilizing the ASK modulation method wherein the degree of modulation is kept to less than 1.

SUMMARY OF THE INVENTION

According to one aspect of the present invention, a data processing apparatus comprises receiving means for receiving an electromagnetic wave which is ASK-modulated by data, rectifying means for rectifying the power of the electromagnetic wave received by the receiving means to provide a power source, demodulating means for demodulating data from the electromagnetic wave received by the receiving means, and a transmitting means for transmitting data by controlling a loading condition of the power source.

According to another aspect of the present invention, data processing method comprises the steps of receiving an electromagnetic wave ASK-modulated by data, feeding a power source by rectifying the power of the electromagnetic wave received, demodulating data from the electromagnetic wave received, executing the processes to the data and transmitting data by controlling the loading condition of the power source.

According to the other aspect of the present invention, a data transmitting and receiving apparatus comprises modulating means for executing ASK modulation for the carrier with data, transmitting and receiving means for transmitting the ASK-modulated electromagnetic wave and receiving the data from a data processing apparatus by detecting any change of the electromagnetic wave and a demodulating means for demodulating the received data.

According to a further aspect of the present invention, a data transmitting and receiving method is comprises the steps of executing ASK modulation to the carrier with a data, transmitting the ASK-modulated electromagnetic wave, and receiving the data from the data processing apparatus by detecting any change of the condition of electromagnetic wave and demodulating the data received.

Other aspects and advantages of the present invention will be apparent from the following detailed description of the presently preferred embodiments thereof, which description should be considered in conjunction with the accompanying drawings.

DESCRIPTION OF THE PREFERRED EMBODIMENT

Figure 1:
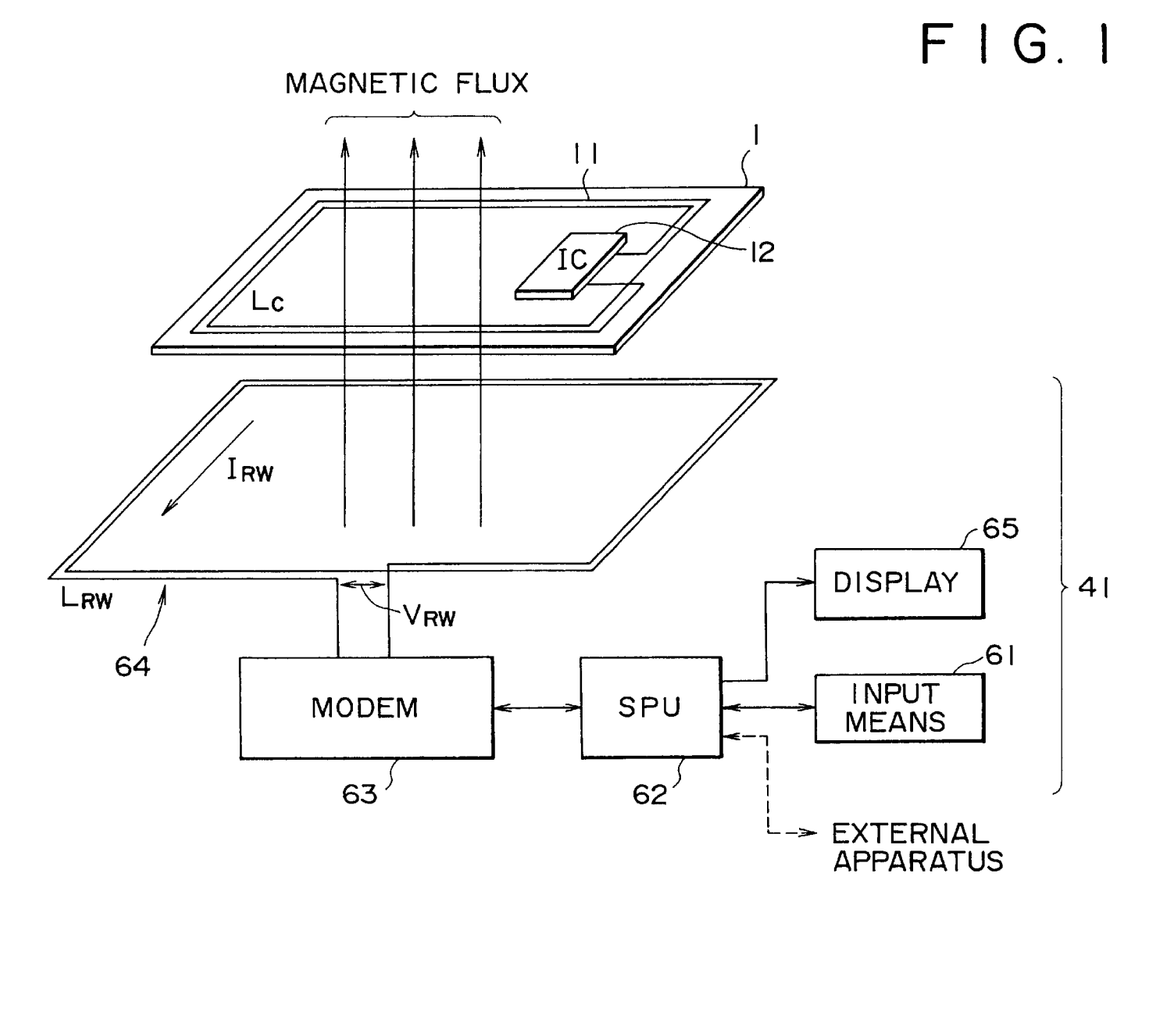
FIG. 1 is a block diagram showing an example of a non-contact card system utilizing an IC card which is an embodiment of the data processing apparatus of the present invention and a reader/writer which is an embodiment of the data-transmitting/receiving apparatus of the present invention.

FIG. 1 shows an example of the structure of a non-contact card system. This card system is composed of an IC card 1 and a reader/writer (R/W) 41.

The IC card which is an embodiment of the data processing apparatus of the present invention is designed as a batteryless type IC card. For example, it is formed as a flat plate such as a credit card and integrates, on a predetermined substrate or film, a loop coil (LC) 11 (receiving means) which electrically converts a part of the magnetic field radiated from the R/W 41 and an Integrated Circuit (IC) 12 comprising electronic circuits to execute various processes.

Figure 2:
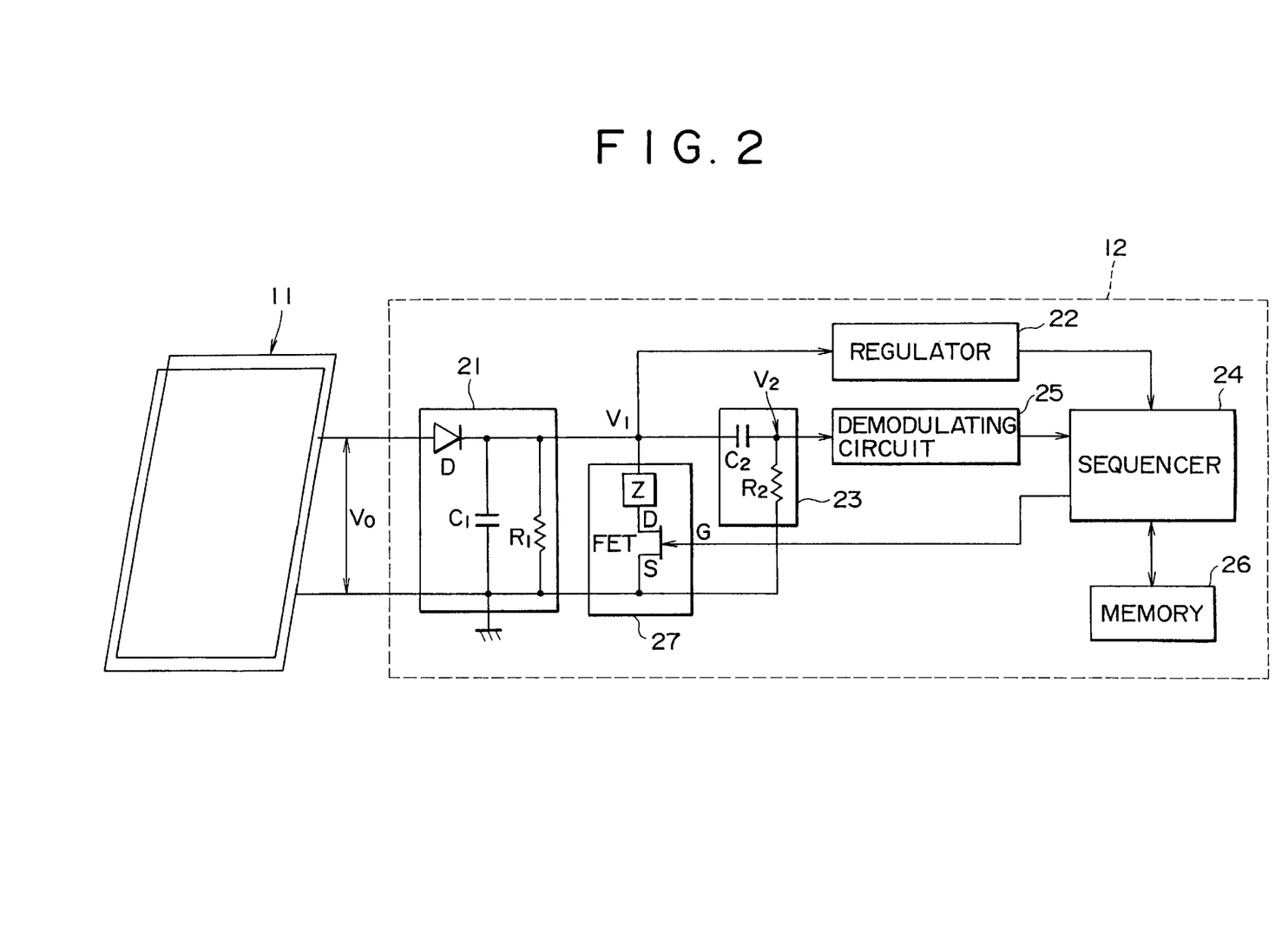
FIG. 2 is a block diagram showing a structural example of an IC card 12 of FIG. 1.

FIG. 2 shows a structural example of the IC 12. In this figure, a rectifying circuit 21 (rectifying means) is formed of a diode D, a capacitor Cl and a resistor R1. In this rectifying circuit 21, the anode terminal of diode D is connected to one end of loop coil 11, while the cathode terminal of diode D to one end of capacitor C1 and resistor R1. Moreover, the other end of capacitor C1 and resistor R1 is respectively connected to the other end of loop coil 11.

The cathode terminal of diode D, one end of capacitor C1 and one end of resistor R1 are connected to one end of an impedance formed of a regulator 22 (stabilizing means), a high-pass filter (HPF) 23 (demodulating means) and a modulating circuit 27 (transmitting means). In addition, the other end of loop coil 11, capacitor C1 and resistor R1 is respectively connected to a source terminal of Field Effect Transistor (FET) of the modulating circuit 27 and also to a ground.

The rectifying circuit 21 rectifies an electrical signal (corresponding to the ASK-modulated wave generated by R/W 41) supplied from the loop coil 11 and smoothes the signal (namely, executes envelope detection) to control the carrier, and thereafter outputs the processed signal to regulator 22 and HPF 23.

The regulator 22 controls and stabilizes voltage fluctuation (data element) of the electrical signal supplied from the rectifying circuit 21 to generate a DC power and thereafter supplies this DC power to a sequencer 24 (processing means). As explained above, the voltage fluctuation generated by movement of IC card 1 and that generated by change in power consumption within the IC card 1 can be controlled.

The HPF 23 is formed of a capacitor C2 and a resistor R2. In HPF 23, one end of capacitor C2 is connected to rectifying circuit 21 (cathode terminal of diode D), while the other end of capacitor C2 is connected to one end of resistor R2 and demodulator 25 (second demodulating means). The other end of resistor R2 is connected to a ground.

The HPF 23 controls the DC element of the signal supplied from the rectifying circuit 21, extracts the data (corresponding to the data generated by a Signal Processing Unit (SPU)) transmitted from R/W 41 and then outputs this data to the demodulator 25. That is, the rectifying circuit 21 and HPF 23 demodulate the ASK-modulated wave.

The demodulator 25 demodulates the data (Biphase Shift Keying (BPSK) modulated signal, as explained below) supplied from HPF 23 and then outputs the demodulated data to the sequencer 24.

The sequencer 24 executes the predetermined processes corresponding to the data supplied from the demodulator 25. The sequencer 24 outputs, on the occasion of transmitting the data to R/W 41, such data to the gate terminal of FET of the modulating circuit 27.

A memory 26 is caused to temporarily store the data under the processes while the sequencer 24 is executing the processes. Moreover, memory 26 is also capable of holding the data such as processing result by utilizing a non-volatile memory which does not requires the power source to hold the data.

As discussed above, modulating circuit 27 is formed of the FET and an impedance Z. In this modulating circuit 27, one end of impedance Z is connected to rectifying circuit 21 (cathode terminal of diode D) and the other end of impedance Z to the drain terminal of the FET. Moreover, the source terminal of the FET is connected to a ground terminal, while the gate terminal of the FET is connected to the sequencer 24.

The modulating circuit 27 causes the FET to execute a switching operation depending on the voltage of the data signal supplied from sequencer 24 to fluctuate a load applied across rectifying circuit 21. Namely, when the FET turns on, impedance Z is added to the load of rectifying circuit 21.

The voltage across loop coil 11 is fluctuated by fluctuating the load of rectifying circuit 21 as explained above. Namely, the ASK modulation is executed. In addition, as shown in FIG. 1, such voltage fluctuation is transferred to a modem 63 (modulating means, demodulating means) via the loop coil (LRW) 64 (transmitting/receiving means) of R/W 41 which is magnetically coupled with loop coil 11.

Next, R/W 41 which is an embodiment of the data transmitting/receiving apparatus of the present invention will be explained.

The R/W 41 of FIG. 1 is caused communicate with IC card 1. In R/W 41, input means 61 is manipulated to issue a command to SPU 62 (second modulating means). The SPU 62 executes various processes depending on the programs loaded. For example, the data transmitted to IC card 1 is BPSK-modulated, and the modulated data is output to modem 63.

Moreover, SPU 62 is capable of displaying the predetermined data on a display 65. Furthermore, SPU 62 is capable of exchanging data with the predetermined external apparatus.

The modem 63 ASK-modulates the carrier of the single frequency with the data (BPSK-modulated signal) supplied from SPU 62 and outputs the modulated carrier to loop coil 64. Moreover, modem 63 demodulates the signal (ASK-modulated wave) from IC card 1 detected by loop coil 64 and outputs the demodulated data to SPU 62.

The loop coil 64 generates a magnetic field corresponding to the modulated wave supplied from modem 63 and detects the fluctuation of the load of loop coil 11 of IC card 1.

Namely, since a terminal voltage of loop coil 64 fluctuates, on the occasion of receiving the data, depending on any change of the load of loop coil 11 of IC card 1 which is magnetically coupled with the loop coil 64, the load change of loop coil 11 of IC card 1 can be detected.

Figure 3:
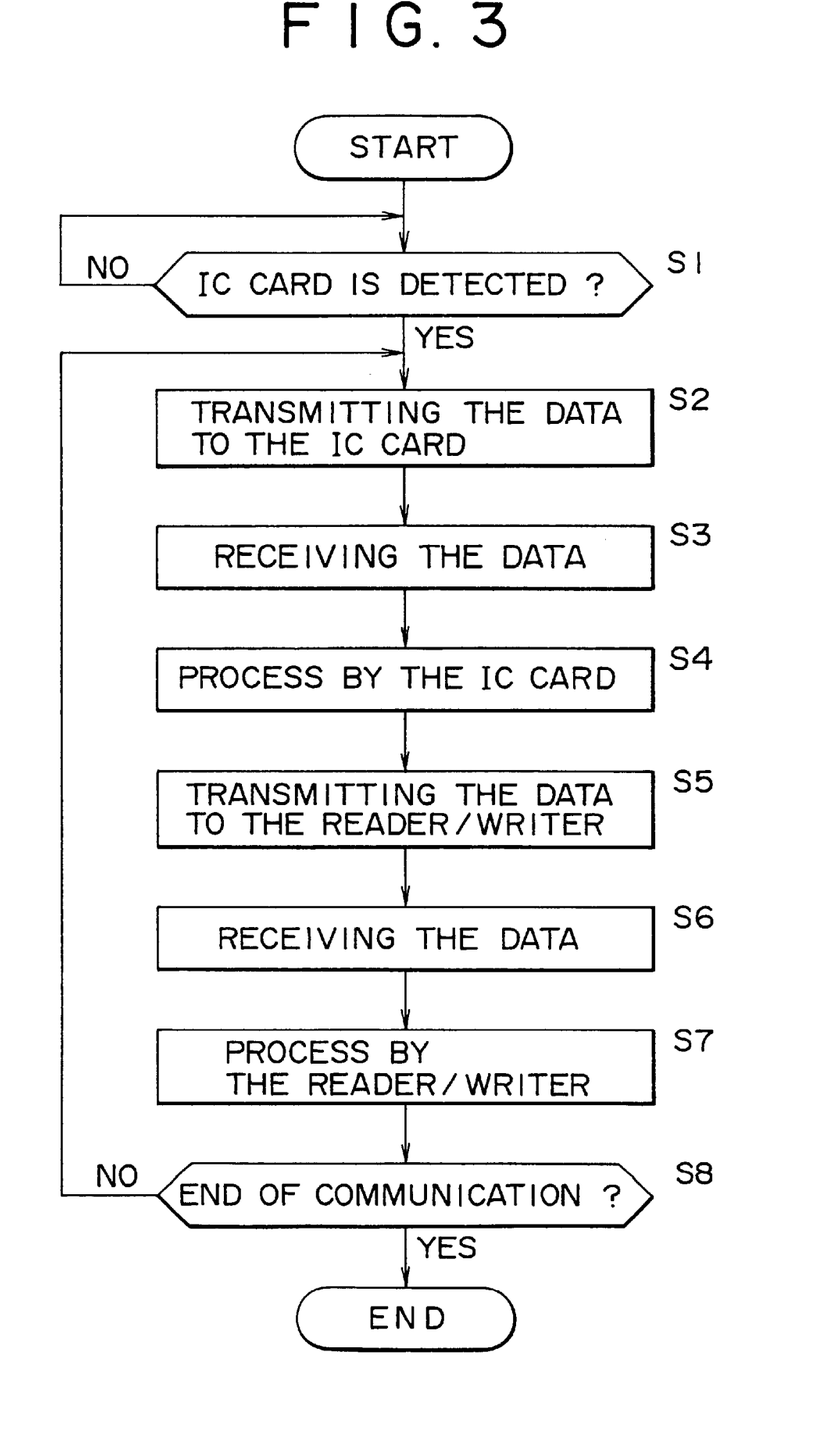
FIG. 3 is a flowchart for explaining operations of the non-contact card system of FIG. 1.
Figure 4:
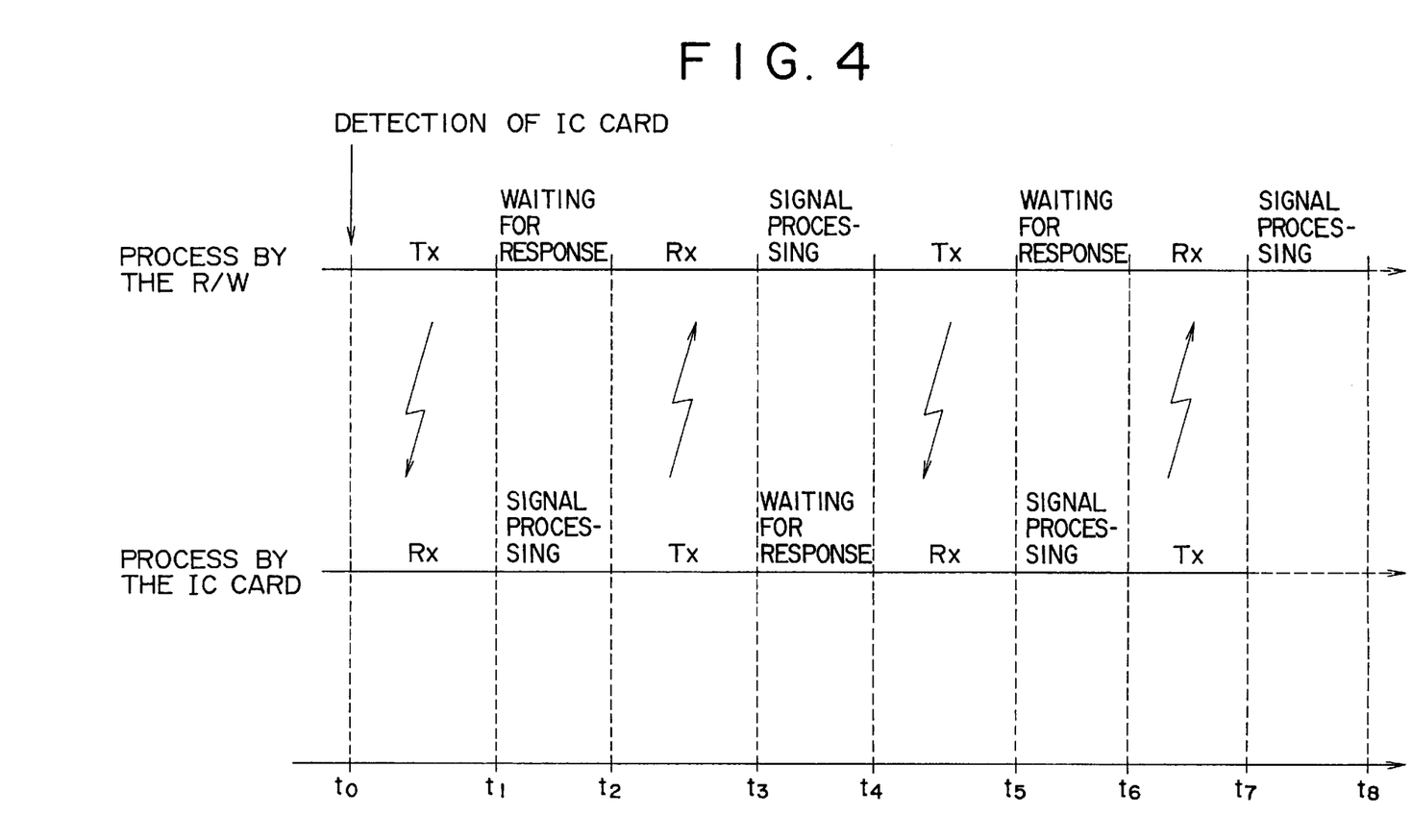
FIG. 4 is a timing chart for explaining an example of the operation of the non-contact card system of FIG. 1.

In addition, with reference to the flowchart of FIG. 3 and the timing chart of FIG. 4, operations of the IC card 1 and R/W 41 will then be explained.

First, in step S1, R/W 41 radiates a predetermined magnetic field from loop coil 64 to monitor the loading condition of loop coil 64, and then enters the waiting condition until IC card 1 comes close and the loading condition change is detected. In step S1, it is also possible that R/W 41 radiate the magnetic field ASK-modulated by the predetermined data of a short pattern to repeat the calling to IC card 1 until the response from IC card 1 is obtained within the predetermined period.

Figure 5A:
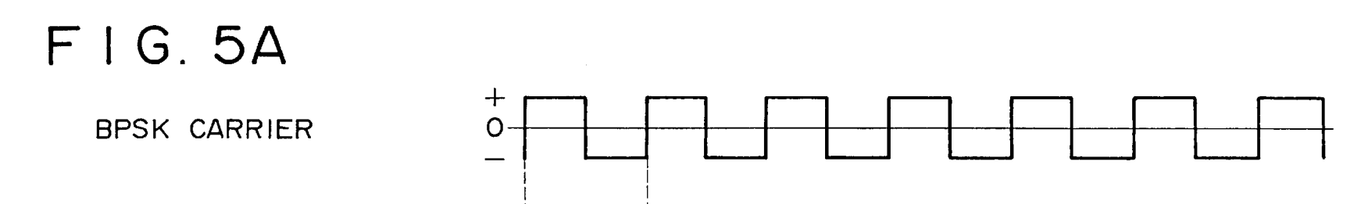
FIGS. 5A to 5D show a diagram for explaining an example of the BPSK modulation.
Figure 5B:
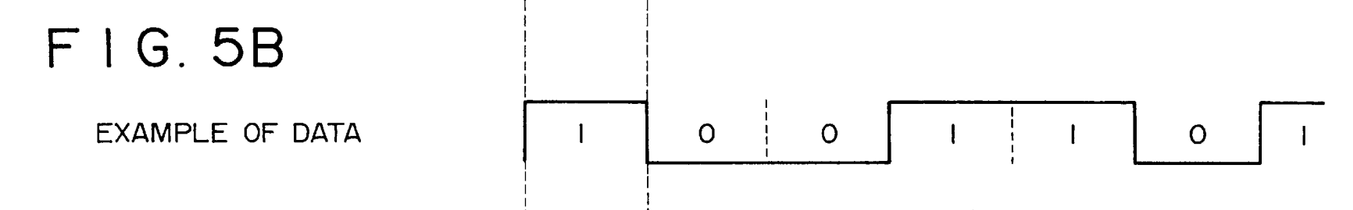
Figure 5C:
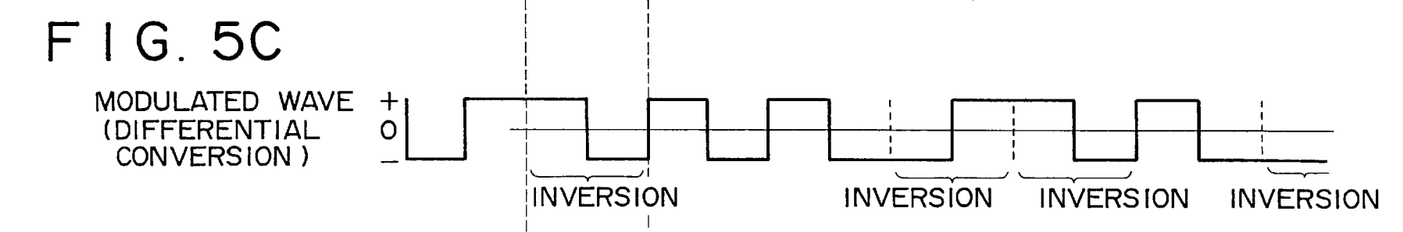
Figure 5D:
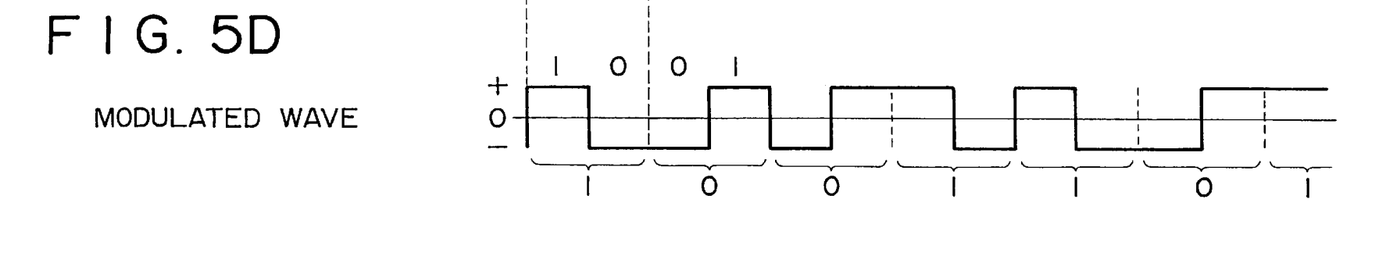

When R/W 41 detects the IC card moving close in step S1, it shifts to step S2 and SPU 62 of R/W 41 modulates the carrier of a rectangular wave in the predetermined frequency (for example, the frequency as high as two times of the clock frequency of data) as shown in FIG. 5(A) with the data (for example, the data shown in FIG. 5(B)) to be transmitted to IC card 1 and then outputs the modulated wave (BPSK modulated signal) (FIG. 5(C)) to modem 63.

As explained above, the S/N ratio characteristic in the binary code generating process during the demodulating operation can be improved by transmitting the modulated wave not including the DC element as the data.

During BPSK modulation, when the data of value 0 appears as shown in FIG. 5(C), the signal same as the preceding BPSK-modulated signal ("1", "0" or "0", "1") is BPSK-modulated utilizing differential conversion, and when the data of value 1 appears, the signal obtained by inverting the phase of the preceding BPSK-modulated signal ("1" is inverted to "0" and "0") is inverted to "1") is BPSK-modulated.

As explained above, even if the BPSK-modulated signal is inverted, since the signal is demodulated into the original signal by holding the data with the phase change of the modulated wave using such differential conversion, it is no longer required to consider the polarity of the modulated wave at the time of executing demodulation. Accordingly, the circuit structure of the demodulating circuit (demodulator 25) can be simplified.

Here, it is also possible, as shown in FIG. 5 (D), that the data in the value 1 is converted to the BPSK-modulated signals "1" and "0", while the data in the value 0 is converted to the BPSK-modulated signals of "0" and "1" of which phases are inverted. In this case, since the receiving side is required to execute the demodulation considering the polarity (phase) of the BPSK-modulated signal received (if the polarity is not considered, data is demodulated inversely) a little restriction is generated on the structure of the demodulating circuit.

The modem 63 ASK-modulates the predetermined carrier with such BPSK-modulated signal, applies the generated modulated wave (ASK-modulated wave) to loop coil 64 and transmits the data to IC card 1 (during the period from time t0 to t1 in FIG. 4).

Figure 6:
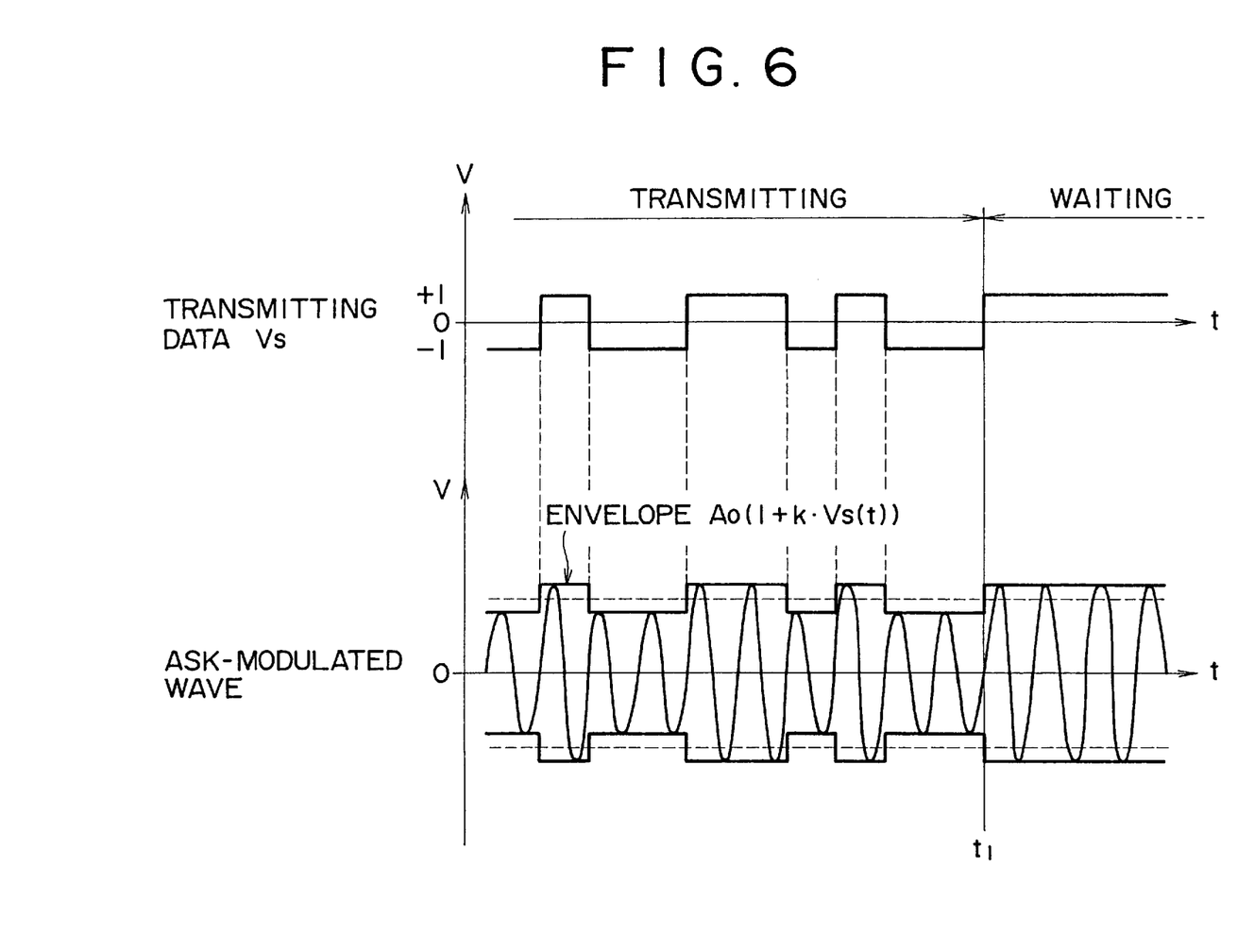
FIG. 6 is a diagram f or explaining operation of a modem 63 of FIG. 1.

FIG. 6 shows an example of the modulated wave generated by the ASK modulation. The modem 63 ASK-modulates the carrier of frequency fc by a predetermined degree of modulation k, where k is less than 1. The degree of modulation k is a ratio of the amplitude of data Vs to the amplitude of the carrier. Since the degree of modulation k is less than 1, as shown in FIG. 6, the ASK-modulated wave having any one of two levels (high and low level) whose maximum amplitude is not zero is generated. As explained above, since the maximum amplitude of the modulated wave does not become zero even in the low level, the power can be supplied to IC card 1 continuously.

When the transmission is not carried out, modem 63 generates the modulated wave in the higher level among the two levels.

Figure 7:
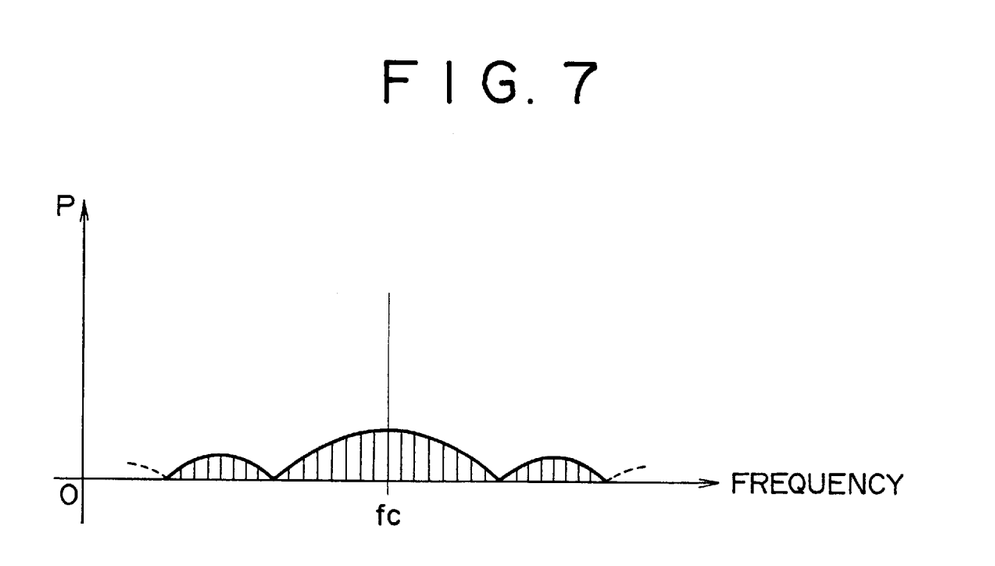
FIG. 7 is a diagram showing an example of the frequency spectrum of the modulated wave generated by the R/W 41.

Moreover, since the modulation degree is less than 1, frequency spectrum of the modulated signal shows that power is centralized at the carrier frequency fc of the carrier. In this case, since the sum of the power of upper and lower sidebands becomes equal to $k^2$ times of the power of carrier frequency fc (carrier power), the carrier power becomes equal to $1/(1+k^2)$ times of the total power of the modulated wave. Accordingly, the carrier power can be set higher than 99% ($\approx 1+0.1002$)) of the total power by setting the modulation degree k to 10.0% or less. As explained above, the carrier power depends only on the modulation degree k and not on the communication rate of the data to be transmitted. Therefore, the modulation degree k can be set independent of the communication rate.

When the waveform of the transmitting data Vs (FIG. 6) is replaced with a sine wave, the total power of the upper and lower sidebands becomes equal to $k^2/2$ times of the carrier power. Therefore, the carrier power becomes $1/(1+k^2/2)$ times of the total power. In this case, when the modulation degree k is set to 14.1% or less, the carrier power becomes 99% ($\approx 1/(1+0.1412/2)$) or more of the total power. Therefore, the maximum value of the modulation degree k can be set within the range from about 10.0% to about 14.1% depending on the degree of band limitation by limiting the band of the modulated wave (waveform of the data Vs becomes close to the sine wave).

Next, in step S3, IC card 1 converts, in loop coil 11, a part of the magnetic field radiated by loop coil 64 of R/W 41. The rectifying circuit 21 rectifies and smoothes the signal converted by the loop coil 11 to control the carrier frequency element (without smoothing the data element) and then outputs such signal to regulator 22 and HPF 23.

In this case, the voltage V0 across the loop coil 11 is expressed, for example, as indicated below.

$$V0 = V10(1 + k \times Vs(t)) \cos(\omega t).$$

Here, V10 indicates the amplitude of the carrier element.

Moreover, the low level value $V_{LR}$ in the voltage V1 after the rectifying is expressed, for example, as follow.

$$V_{LR} = V10(1 + k \times (-1)) - Vf$$

Here, Vf indicates a voltage drop in the diode D of the rectifying circuit 21. Usually, Vf is about 0.7 V.

The regulator 22 stabilizes the signal rectified and smoothed in rectifying circuit 21 and supplies such signal to sequencer 24 as the DC power. Since the modulation degree k is less than 1, the voltage change (difference between the high and low levels) after the rectifying is small. Therefore, regulator 22 can easily generate the DC power. On the other hand, HPF 23 controls the DC element of the signal supplied from rectifying circuit 21 and outputs the AC element (data element) to demodulator 25. In this case, fluctuation of the lower frequency element of the voltage V1 generated by movement of the IC card 1 is also controlled.

For instance, when the modulated signal in the modulation degree k of 5% is received so that V10 becomes 3V or higher, the low level voltage $V_{LR}$ after the rectifying becomes 2.15 (=3×(1−0.05)−0.7) V or higher. Here, regulator 22 supplies the voltage (for example, 2V) which is sufficient as the power source to sequencer 24, the amplitude 2×k×V10 (Peak-to-Peak value) of the AC element (data element) of the voltage V1 after the rectifying becomes 0.3 (=2×0.05×3)V or higher and demodulator 25 can execute the demodulation of data with sufficiently high S/N ratio.

Even when the modulation degree k is less than 1 as explained above, data can be demodulated with a high S/N ratio. Thereby, communication with a lower error rate can be made and a sufficient DC voltage as the power source can also be supplied to the sequencer 24.

FIG. 8 shows the correspondence between the receiving data or transmitting data and the output voltage V1 of rectifying circuit 21 and the output voltage V2 of HPF 23.

Figure 8A:
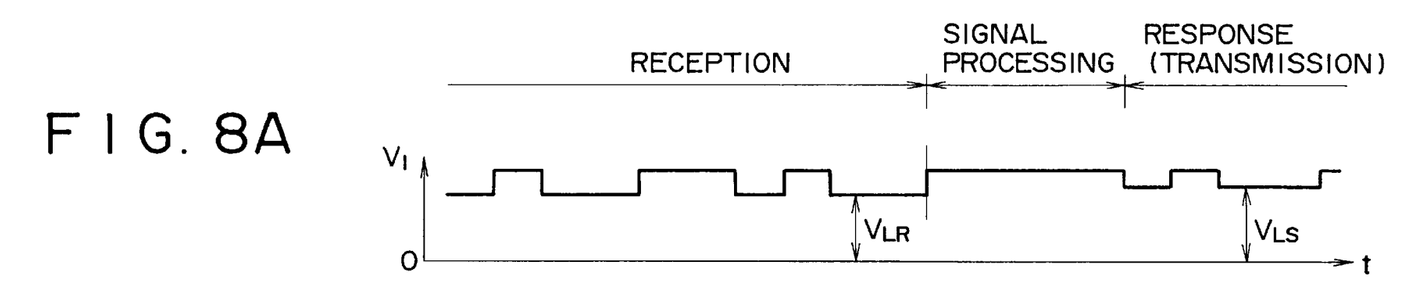
FIGS. 8A to 8D show an example of voltage waveforms at each point of the IC card 1 during data transmission and reception.
Figure 8B:
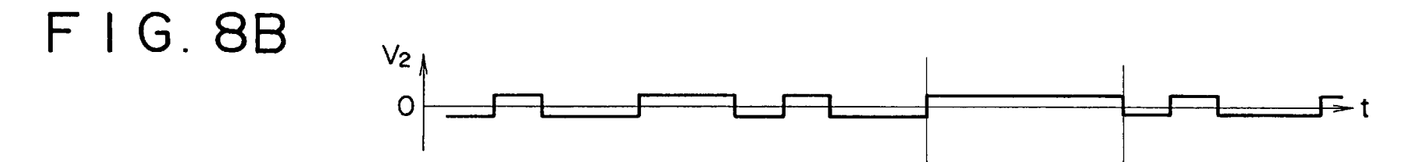

For example, when the output voltage V1 of rectifying circuit 21 as shown in FIG. 8A is output to HPF 23, HPF 23 controls its DC element (low frequency element), extracts the data signal having the polarity as shown in FIG. 8B and outputs this data signal to demodulator 25.

Figure 8C:
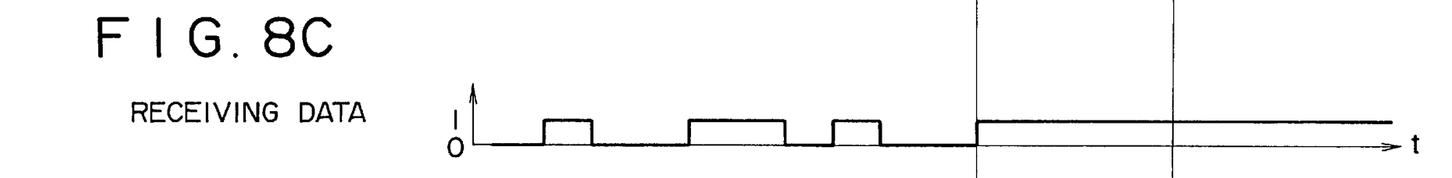

The demodulator 25 converts the data signal having such polarity into the digital data of 1 or 0 as shown in FIG. 8C using a zero-cross comparator and demodulates such data (BPSK modulated signal) and thereafter outputs the demodulated data to sequencer 24.

Referring back to FIG. 3, in step S4, sequencer 24 executes the process corresponding to the supplied data (during the period from time t1 to time t2 of FIG. 4). During this period, namely until the response from IC card 1 is received, R/W 41 is in the waiting condition after it has transmitted the data. Therefore, the output value V1 indicates the condition that the data of value 1 is received during this period (from the time t1 to the time t2 in FIG. 8).

Next, in step S5, sequencer 24 outputs the data such as processing result to modulating circuit 27. The modulating circuit 27 transmits such data to R/W 41 (during the period from time t2 to time t3 in FIG. 4).

Figure 8D:
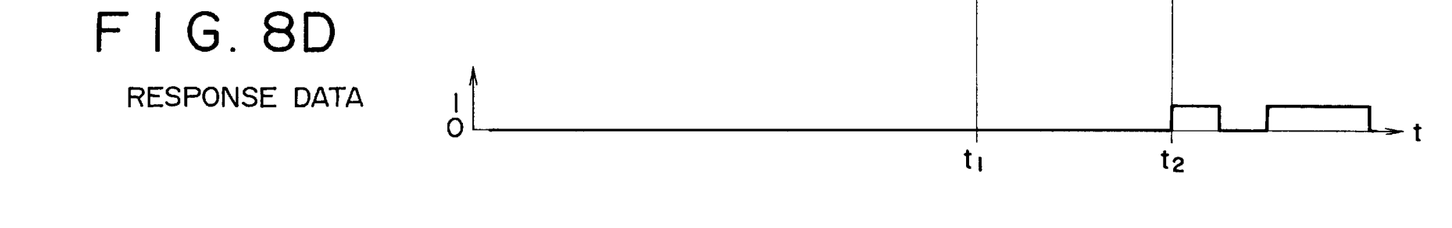

The modulation circuit 27 causes the FET to execute the switching operation depending on the voltage value of the data (signal) to change the loading condition of rectifying circuit 21. For example, when the data shown in FIG. 8D is output to the FET of modulating circuit 27, the loading condition of rectifying circuit 21 changes due to switching operation of the FET, and the output voltage V1 of rectifying circuit 21 changes as well depending on the data as shown in FIG. 8A.

In this case, a value of impedance Z is set so that the low level voltage $V_{LS}$ of the output voltage V1 at the time of transmission becomes higher than the low level voltage $V_{LR}$ of the output voltage V1 at the time of reception (namely, the voltage change at the time of transmission is less than the voltage change at the time of reception) in view of obtaining the power source voltage of sequencer 24. Thereby, regulator 22 can supply sufficient power to sequencer 24 even during the transmission.

In R/W 41, the larger the amplitude change of the signal detected, the better the S/N characteristic during the demodulation of the data transmitted. Therefore, it is desirable to set $V_{LS}$ (namely, the impedance Z) so that $V_{LS}$ becomes larger than $V_{LR}$, and in particular, so that $V_{LS}$ is almost equal to $V_{LR}$.

In step S6, modem 63 of R/W 41 continuously transmits the data 1 even during the reception of data from IC card 1. The modem 63 detects the load change (voltage change) of rectifying circuit 21 of IC card 1 from a small change of the terminal voltage (for example, several tens of mV) of loop coil 64 which is magnetically coupled with loop coil 11 of IC card 1.

The modem 63 amplifies the detected signal (ASK-modulated wave) with a high-gain amplifier and thereafter demodulates the data to output the digital data generated to SPU 62.

In the case of transmitting the data to R/W 41 from IC card 1, it is also possible that sequencer 24 of IC card 1 executes the BPSK modulation and BPSK-modulated signal is demodulated by SPU 62 of R/W 41.

In step S7, SPU 62 executes the predetermined process to such data (during the period from time t3 to the time t4 in FIG. 4).

Moreover, in step S8, SPU 62 judges whether communication should be completed or not depending on the processing result. When the positive result is obtained, R/W 41 returns to step S2 and carries out the communication of the next data (during the period from time t4 to time t8 in FIG. 4) in steps S2 to S7. Meanwhile, when a negative result is obtained at step S8, R/W 41 completes the communication with IC card 1.

As explained previously, in the non-contact system formed of IC card 1 and R/W 41, the stabilized DC power is supplied to IC card 1 utilizing the ASK-modulation in which the modulation degree k is less than 1, and the occupied frequency band can be narrowed without lowering the communication rate.

In above embodiment, the data to be transmitted is once BPSK-modulated and then ASK-modulated for the transmission, but, it is also possible to transmit the data by ASK-modulation without executing the BPSK-modulation. In this case, the S/N characteristic during the demodulation may probably be lowered a little.

Figure 9:
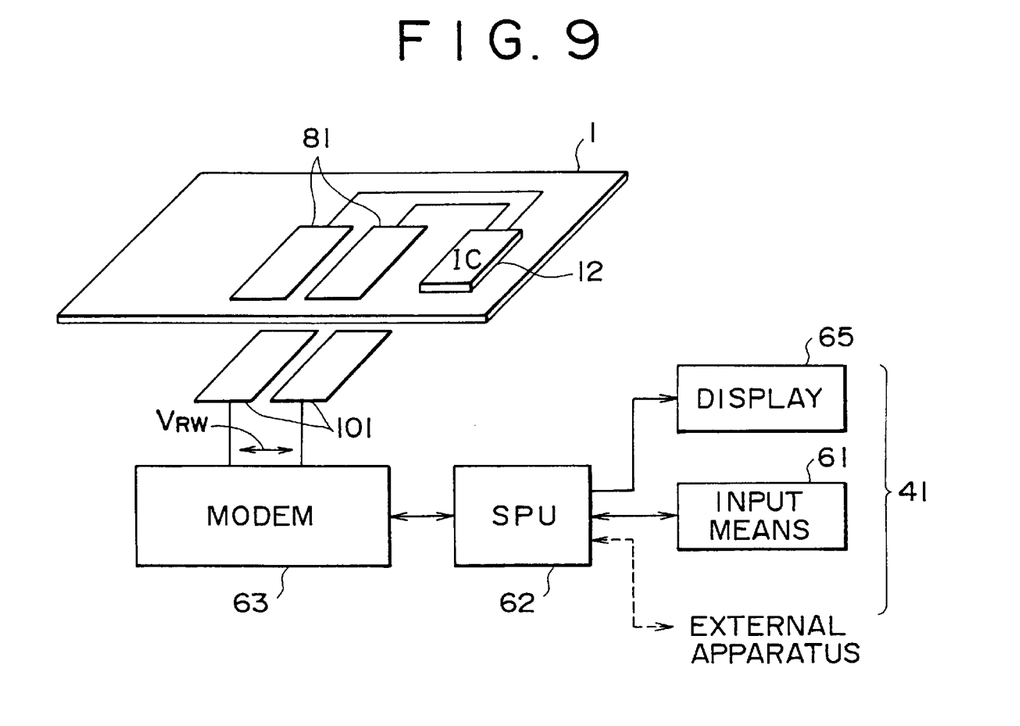
FIG. 9 is a block diagram showing the other structural example of the non-contact card system.

FIG. 9 shows the other structural example of the non-contact card system in accordance with the present invention. In this non-contact card system, IC card 1 has a flat electrode 81 in place of loop coil 11 of FIG. 1, while R/W 41 has a flat electrode 101 in place of loop coil 64 of FIG. 1. Communication between IC card 1 and R/W 41 is executed via these flat electrodes 81, 101 by making use of changes of electric field.

Other structural elements and system operations are similar to the non-contact card system of FIG. 1 and the same explanation is not repeated here.

Figure 10:
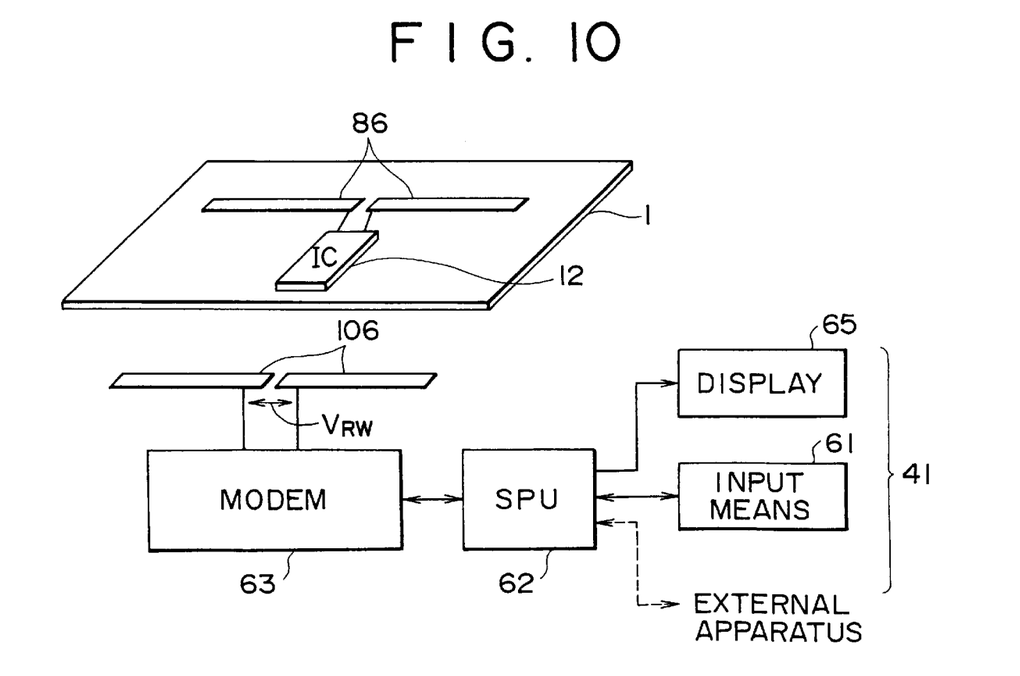
FIG. 10 is a block diagram showing the other structural example of the non-contact card system.

FIG. 10 shows yet another structural example of the non-contact card system in accordance with the present invention. In this non-contact card system, the IC card has a half wavelength dipole antenna 86 in place of loop coil 11 of FIG. 1, while R/W 41 has a half wavelength dipole antenna 106 in place of loop coil 64 of FIG. 1. Communication between IC card 1 and R/W 41 is thus executed via these half wavelength dipole antennas 86, 106 by making use of microwave or quasi-microwave signal.

Here, the half wavelength dipole antennas 86, 106 may be replaced with one-wavelength loop antenna.

The other structural elements and system operations are similar to that of the non-contact card system of FIG. 1 and therefore the same explanation is not repeated here.

The non-contact card system explained above can be applied, for example, to the ticket inspecting apparatus, security system and electronic money system.

As explained above, in accordance with the data processing apparatus and the data processing method of the present invention, since the electromagnetic wave ASK-modulated depending on the data is received, the power of the received electromagnetic wave is rectified for use as the power source and the data is transmitted by controlling the loading condition for the power source, the electromagnetic wave of narrow occupied frequency band can be received and the power and data can be extracted from such received signal.

Moreover, as explained above, in accordance with the data transmitting and receiving apparatus and the data transmitting and receiving method of the present invention, since the electromagnetic wave ASK-modulated by the data is transmitted and data from the data processing apparatus is received by detecting any change of the electromagnetic wave transmitted, communication may be executed at a higher communication rate while the occupied frequency band is kept narrow and the sufficient electric power source can be supplied to the IC card.

What is claimed is:

1. A flat type data processing apparatus providing electronic circuits on a substrate or a film to transmit or receive data on a non-contact basis and to process said data, comprising:

receiving means for receiving an electromagnetic wave ASK-modulated by said data;

rectifying means for rectifying a power of the electromagnetic wave received by said receiving means into a power source;

demodulating means for demodulating said data from the electromagnetic wave received by said receiving means;

processing means for processing said data; and transmitting means for transmitting data by controlling the load of said power source;

wherein said electromagnetic wave is further ASK-modulated by a BPSK-modulated data, said apparatus further including second demodulating means for demodulating the BPSK-modulated data.

2. The apparatus of claim 1 wherein said electromagnetic wave is ASK-modulated by a modulation degree which is less than 1, wherein the modulation degree is an amplitude ratio of the data and a carrier wave.

3. The apparatus of claim 2 wherein said electromagnetic wave is ASK-modulated by the modulation degree to maintain a power of the carrier frequency at 99% or higher than the total power of said electromagnetic wave.

4. The apparatus of claim 3 wherein said electromagnetic wave has a single carrier frequency.

5. The apparatus of claim 4 wherein said electromagnetic wave is a microwave and said receiving means includes a half wavelength dipole antenna or a one-wavelength loop antenna.

6. The apparatus of claim 5 further including stabilizing means for stabilizing said power source generated by said rectifying means.

7. The apparatus of claim 6 wherein said transmitting means substantially transmits the data through the ASK-modulation.

8. The apparatus of claim 1 wherein said electromagnetic wave has a single carrier frequency.

9. The apparatus of claim 8 wherein said electromagnetic wave is a microwave and said receiving means includes a half wavelength dipole antenna or a one-wavelength loop antenna.

10. The apparatus of claim 9 further including stabilizing means for stabilizing said power source generated by said rectifying means.

11. The apparatus of claim 10 wherein said transmitting means substantially transmits the data through the ASK-modulation.

12. The apparatus of claim 1 wherein said electromagnetic wave is a microwave and said receiving means includes a half wavelength dipole antenna or a one-wavelength loop antenna.

13. The apparatus of claim 12 further including stabilizing means for stabilizing said power source generated by said rectifying means.

14. The apparatus of claim 13 wherein said transmitting means substantially transmits the data through the ASK-modulation.

15. The apparatus of claim 1 further including stabilizing means for stabilizing said power source generated by said rectifying means.

16. The apparatus of claim 15 wherein said transmitting means substantially transmits the data through the ASK-modulation.

17. The apparatus of claim 1 wherein said transmitting means substantially transmits the data through the ASK-modulation.

18. A flat type data processing method providing electronic circuits on a substrate or a film to transmit or receive data on a non-contact basis and to process said data, comprising the steps of:

receiving an electromagnetic wave ASK-modulated by said data;

rectifying a power of the electromagnetic wave received by said receiving step into a power source;

demodulating said data from the electromagnetic wave received by said receiving step;

processing said data; and transmitting said data by controlling the load of said power source;

wherein said method further includes the steps of:
further ASK-modulating said electromagnetic wave by a BPSK-modulated data; and
demodulating the BPSK-modulated data.

19. The method of claim 18 wherein said electromagnetic wave is ASK-modulated by a modulation degree which is less than 1, wherein the modulation degree is an amplitude ratio of the data and a carrier wave.

20. The method of claim 19 wherein said electromagnetic wave is ASK-modulated by the modulation degree to maintain a power of the carrier frequency at 99% or higher than the total power of said electromagnetic wave.

21. The method of claim 20 wherein said electromagnetic wave has a single carrier frequency.

22. The method of claim 21 wherein said electromagnetic wave is a microwave and said step of receiving includes the step of providing a half wavelength dipole antenna or a one-wavelength loop antenna for receiving said microwave.

23. The method of claim 22 further including the step of stabilizing said power source generated by said step of rectifying.

24. The method of claim 7 wherein said step of transmitting substantially transmits the data through the ASK-modulation.

25. The method of claim 18 wherein said electromagnetic wave has a single carrier frequency.

26. The method of claim 25 wherein said electromagnetic wave is a microwave and said step of receiving includes the step of providing a half wavelength dipole antenna or a one-wavelength loop antenna for receiving said microwave.

27. The method of claim 10 further including the step of stabilizing said power source generated by said rectifying step.

28. The method of claim 27 wherein said step of transmitting substantially transmits the data through the ASK-modulation.

29. The method of claim 18 wherein said electromagnetic wave is a microwave and said step of receiving includes the step of providing a half wavelength dipole antenna or a one-wavelength loop antenna for receiving said microwave.

30. The method of claim 29 further including the step of stabilizing said power source generated by said rectifying step.

31. The method of claim 30 wherein said step of transmitting substantially transmits the data through the ASK-modulation.

32. The method of claim 18 further including the step of stabilizing said power source generated by said rectifying step.

33. The method of claim 32 wherein said transmitting step substantially transmits the data through the ASK-modulation.

34. The method of claim 18 wherein said transmitting step substantially transmits the data through the ASK-modulation.

35. A data transmitting and receiving apparatus for executing transmission and reception of said data on a non-contact basis for a flat type data processing apparatus providing electronic circuits for executing processing of data on a substrate or a film, comprising:

modulating means for executing an ASK-modulation by said data;

transmitting/receiving means for transmitting the ASK-modulated electromagnetic wave and receiving said data from said data processing apparatus by detecting any change of condition of said electromagnetic wave;

modulating means for demodulating the received data; and second modulating means for modulating the predetermined data to generate a modulated signal not including the DC element.

36. The apparatus of claim 35 wherein said modulating means executes the ASK-modulation with a modulation degree less than 1, wherein the modulation degree is an amplitude ratio of the data and a carrier wave.

37. The apparatus of claim 36 wherein said modulating means executes the ASK-modulation with the modulation degree to maintain a power of the carrier frequency at 99% or higher than the total power of said electromagnetic wave.

38. The apparatus of claim 37 wherein said electromagnetic wave has a carrier of single frequency.

39. The apparatus of claim 38 wherein said second modulating means executes a BPSK-modulation.

40. The apparatus of claim 39 wherein said electromagnetic wave is a microwave and said transmitting/receiving means includes a half-wavelength dipole antenna or a one-wavelength loop antenna.

41. The apparatus of claim 35 wherein said modulating means executes the ASK-modulation with the modulation degree to maintain a power of the carrier frequency at 99% or higher than the total power of said electromagnetic wave.

42. The apparatus of claim 41 wherein said electromagnetic wave has a carrier of single frequency.

43. The apparatus of claim 42 wherein said second modulating means executes a BPSK-modulation.

44. The apparatus of claim 43 wherein said electromagnetic wave is a microwave and said transmitting/receiving means includes a half-wavelength dipole antenna or a one-wavelength loop antenna.

45. The apparatus of claim 35 wherein said electromagnetic wave has a carrier of single frequency.

46. The apparatus of claim 45 wherein said second modulating means executes a BPSK-modulation.

47. The apparatus of claim 46 wherein said electromagnetic wave is a microwave and said transmitting/receiving means includes a half-wavelength dipole antenna or a one-wavelength loop antenna.

48. The apparatus of claim 35 wherein said second modulating means executes a BPSK-modulation.

49. The apparatus of claim 48 wherein said electromagnetic wave is a microwave and said transmitting/receiving means includes a half-wavelength dipole antenna or a one-wavelength loop antenna.

50. The apparatus of claim 35 wherein said electromagnetic wave is a microwave and said transmitting/receiving means includes a half-wavelength dipole antenna or a one-wavelength loop antenna.

51. A data transmitting and receiving method for executing transmission and reception of said data on a non-contact basis for a flat type data processing apparatus providing electronic circuits for executing processing of data on a substrate or a film, comprising the steps of:

executing an ASK-modulation by said data;

transmitting the ASK-modulated electromagnetic wave and receiving said data from said data processing apparatus by detecting a change of condition of said electromagnetic wave;

demodulating the received data; and modulating a predetermined data to generate a modulated signal not including the DC element.

52. The method of claim 51 wherein said executing step executes the ASK-modulation with a modulation degree less than 1, wherein the modulation degree is an amplitude ratio of the data and a carrier wave.

53. The method of claim 52 wherein said executing step executes the ASK-modulation with the modulation degree to maintain a power of the carrier frequency at 99% or higher than the total power of said electromagnetic wave.

54. The method of claim 53 wherein said electromagnetic wave has a carrier of single frequency.

55. The method of claim 54 wherein said modulating step executes a BPSK-modulation.

56. The method of claim 55 wherein said electromagnetic wave is a microwave and said transmitting and receiving step includes the step of providing a half-wavelength dipole antenna or a one-wavelength loop antenna for transmitting and/or receiving said microwave.

57. The method of claim 56 wherein said executing step executes the ASK-modulation with the modulation degree to maintain a power of the carrier frequency at 99% or higher than the total power of said electromagnetic wave.

58. The method of claim 57 wherein said electromagnetic wave has a carrier of single frequency.

59. The method of claim 58 wherein said modulating step executes a BPSK-modulation.

60. The method of claim 59 wherein said electromagnetic wave is a microwave and said transmitting/receiving step includes the step of providing a half-wavelength dipole antenna or a one-wavelength loop antenna for transmitting and/or receiving said microwave.

61. The method of claim 51 wherein said electromagnetic wave has a carrier of single frequency.

62. The method of claim 61 wherein said modulating step executes a BPSK-modulation.

63. The method of claim 62 wherein said electromagnetic wave is a microwave and said transmitting/receiving step includes the step of providing a half-wavelength dipole antenna or a one-wavelength loop antenna for transmitting and/or receiving said microwave.

64. The method of claim 51 wherein said modulating step executes a BPSK-modulation.

65. The method of claim 64 wherein said electromagnetic wave is a microwave and said transmitting/receiving step includes the step of providing a half-wavelength dipole antenna or a one-wavelength loop antenna for transmitting and/or receiving said microwave.

66. The method of claim 51 wherein said electromagnetic wave is a microwave and said transmitting/receiving step includes the step of providing a half-wavelength dipole antenna or a one-wavelength loop antenna for transmitting and/or receiving said microwave.

67. A flat type data processing apparatus providing electronic circuits on a substrate or a film to transmit or receive data on a non-contact basis and to process said data, comprising:

a loop coil for receiving an electromagnetic wave ASK-modulated by said data;

a rectifying circuit for rectifying a power of the electromagnetic wave received by said loop coil into a power source;

a high pass filter, with said rectifying circuit, for demodulating said data from the electromagnetic wave received by said loop coil;

a sequencer for processing said data; and a transmitting unit for transmitting data by controlling the load of said power source;

wherein said electromagnetic wave is further ASK-modulated by a BPSK-modulated data, said apparatus further including a demodulator for demodulating the BPSK-modulated data.

68. The apparatus of claim 67 wherein said electromagnetic wave is ASK-modulated by a modulation degree which is less than 1, wherein the modulation degree is an amplitude ratio of the data and a carrier wave.

69. The apparatus of claim 68 wherein said electromagnetic wave is ASK-modulated by the modulation degree to maintain a power of the carrier frequency at 99% or higher than the total power of said electromagnetic wave.

70. The apparatus of claim 69 wherein said electromagnetic wave has a single carrier frequency.

71. The apparatus of claim 70 further including a regulator for stabilizing said power source generated by said rectifying circuit.

72. The apparatus of claim 71 wherein said transmitting unit substantially transmits the data through the ASK-modulation.

73. The apparatus of claim 67 wherein said electromagnetic wave has a single carrier frequency.

74. The apparatus of claim 73 further including a regulator for stabilizing said power source generated by said rectifying circuit.

75. The apparatus of claim 74 wherein said transmitting unit substantially transmits the data through the ASK-modulation.

76. The apparatus of claim 67 further including a regulator for stabilizing said power source generated by said rectifying circuit.

77. The apparatus of claim 76 wherein said transmitting unit substantially transmits the data through the ASK-modulation.

78. The apparatus of claim 67 wherein said transmitting unit substantially transmits the data through the ASK-modulation.

79. A flat type data processing apparatus providing electronic circuits on a substrate or a film to transmit or receive data on a non-contact basis and to process said data, comprising:

receiving means for receiving an electromagnetic wave ASK-modulated by said data;

rectifying means for rectifying a power of the electromagnetic wave received by said receiving means into a power source;

demodulating means for demodulating said data from the electromagnetic wave received by said receiving means;

processing means for processing said data; and transmitting means for transmitting data by controlling the load of said power source;

wherein said ASK modulated electromagnetic wave includes a modulated data signal which does not substantially include a dc element and wherein said modulated data signal is an ASK-modulated wave modulated by BPSK modulation.

80. A flat type data processing method providing electronic circuits on a substrate or a film to transmit or receive data on a non-contact basis and to process said data, comprising the steps of:

receiving an electromagnetic wave ASK-modulated by said data;

rectifying a power of the electromagnetic wave received by said receiving step into a power source;

demodulating said data from the electromagnetic wave received by said receiving step;

processing said data; and transmitting data by controlling the load of said power source;

wherein said ASK modulated electromagnetic wave includes a modulated data signal which does not substantially include a dc element and wherein said modulated data signal is an ASK-modulated wave modulated by BPSK modulation.

81. A flat type data processing apparatus providing electronic circuits on a substrate or a film to transmit or receive data on a non-contact basis and to process said data, comprising:

a loop coil for receiving an electromagnetic wave ASK-modulated by said data;

a rectifying circuit rectifying a power of the electromagnetic wave received by said loop coil into a power source;

a high pass filter, with said rectifying circuit, for demodulating said data from the electromagnetic wave received by said loop coil;

a sequencer for processing said data; and a transmitting unit for transmitting data by controlling the load ot said power source;

wherein said ASK modulated electromagnetic wave includes a modulated data signal which does not substantially include a de element and wherein said modulated data signal is an ASK-modulated wave modulated by BPSK modulation.

* * * * *